(12) United States Patent
Kiselev et al.

(10) Patent No.: US 8,805,886 B1
(45) Date of Patent: Aug. 12, 2014

(54) RECOVERABLE SINGLE-PHASE LOGGING

(75) Inventors: Oleg Kiselev, Palo Alto, CA (US); John A. Colgrove, Los Altos, CA (US)

(73) Assignee: Symantec Operating Corporation, Mountain View, CA (US)

( * ) Notice: Subject to any disclaimer, the term of this patent is extended or adjusted under 35 U.S.C. 154(b) by 3170 days.

(21) Appl. No.: 10/854,394

(22) Filed: May 26, 2004

(51) Int. Cl.
*G06F 17/30* (2006.01)

(52) U.S. Cl.
USPC .......................................... 707/793; 707/803

(58) Field of Classification Search
USPC .............................. 707/204; 714/13; 711/104
See application file for complete search history.

(56) References Cited

U.S. PATENT DOCUMENTS

| | | | |
|---|---|---|---|
| 6,163,856 A | 12/2000 | Dion et al. | |
| 2004/0268026 A1* | 12/2004 | Royer et al. | 711/104 |
| 2005/0015416 A1* | 1/2005 | Yamagami | 707/204 |
| 2005/0193245 A1* | 9/2005 | Hayden et al. | 714/13 |

OTHER PUBLICATIONS

"Logical Characteristics—6.1 SCSI Bus Phase," http://www.danbbs.dk/~dino/SCSI/SCS12-06, Feb. 10, 2001 (10 Pages).

Lawrence J. Lamers, "Information Technology—Small Computer System Interface—2," Working Draft X3T9.2 Project 375D, Revision 10L, Sep. 7, 1993, (pp. 40-49).

Ganger et al., "Soft Updates: A Solution to the Metadata Update Problem in File Systems," ACM Transactions on Computer Systems, vol. 18, No. 2, May 2000, pp. 127-153).

Ralph O. Weber, "Information Technology—SCSI Object—Based Storage Device Commands (OSD)," Workin: Draft—Project T10/1355-D, Revision 6, Intel Labs, Aug. 23, 2002, (28 Pages).

Bohannon et al., Distributed Multi-Level Recovery in Main-Memory Databases, PDIS, citeseer.ist.psu.edu/bohannon96distributed.html, 1996, (pp. 44-55).

* cited by examiner

*Primary Examiner* — Syed Hasan

(74) *Attorney, Agent, or Firm* — Robert C. Kowert; Meyertons, Hood, Kivlin, Kowert & Goetzel, P.C.

(57) ABSTRACT

A log manager may store a validation indicator with each data block of a log entry. The log manager may create a header block for each log entry that may include a validation indicator or tag. Such a validation indicator may be stored within the metadata for each data block. The validation indicator may additionally be stored in the metadata for the header block and it may be stored in header block itself. When recovering such a log, according to some embodiments, the validation indicators for each data block are checked against the validation indicator in the header block.

30 Claims, 9 Drawing Sheets

RECOVERABLE SINGLE-PHASE LOGGING

BACKGROUND OF THE INVENTION

1. Field of the Invention

This invention relates to data storage and, more particularly, to recoverable single-phase logging using validation indicators.

2. Description of the Related Art

Modern business operations frequently rely upon continual access to large amount of data. Rapid recovery of access to data and preservation of data correctness in cases of access interruption caused by hardware, software or operational failures may be extremely important. Some common examples of such failures are power outages, storage interconnect failures, hardware or software malfunctions that results in a system crash, and other disasters. Various techniques may be used after such disasters to bring data back into accessible and consistent state as rapidly as possible. With ever-growing amounts of data, operations that enhance data availability and reliability, such as backing up, restoring, logging, mirroring, and synchronizing can be of significant importance.

One example of an operation that may enhance data availability and reliability is the use of journals or logs. Recoverable logs are sometimes implemented to temporarily, but persistently, store, or stage, copies of data in a format that may be optimal for writing, but may be suboptimal for reading, before they have been written to more permanent, regular data storage where read performance may be important. Using logs in this way may allow completing a data write as soon as the usually faster log write is completed, These copies may be used to repair, replace, or synchronize the data storage sources in the event of a system or storage failure.

Recoverable logs are commonly implemented using a two-phase write operation that may require the writing of an additional "trailer" record, "committing" the write. The trailer record may be written to the log only after it is certain that the data being logged has been completely written to the log. The trailer may contain pertinent information about a previous log write. In other words, a second block may be written recording both the fact that the individual data blocks were correctly committed to storage, and possibly where they were stored. This approach may increase the latency of the entire write operation because it may have to wait for the log write of the regular data to be completed before the trailer record is written.

Another common logging approach is to replace part of each data block with an informational header that identifies the block as part of the complete log entry. This second approach may require storing the data displaced from each block to make room for the informational header into one or more additional blocks that must also be committed to storage. Copying displaced data to create the log records usually requires creation of a separate copy of data, which may incur the overhead of allocating, mapping and copying of blocks of computer memory. Ensuring that this displaced data is merged back into the original data block upon reading the log entry may be require additional memory mapping operations.

SUMMARY

Reliable, recoverable logs may be stored and validated by storing a validation indicator for each data block. A storage device may be configured to atomically store metadata, including a validation indicator, with each data block. In addition, a header record (block) may be created for each log entry that includes information identifying the data blocks of the log entry and that may include the validation indicator or tag. Such a validation indicator may be stored within the metadata for each data block. In some embodiments, the validation indicator may additionally be stored in the metadata for the header record, while in others it may only be stored in the header record itself. The writing of the header record and the data blocks may be done in parallel and simultaneously, incurring minimal additional latency overhead. When recovering such a log, according to some embodiments, the validation indicators from the metadata for each data block are checked against the validation indicator from the header block, or from the metadata of the header block. If all the validation indicators match, the log entry may be valid. If one or more tags do not match, the log entry may be invalid.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
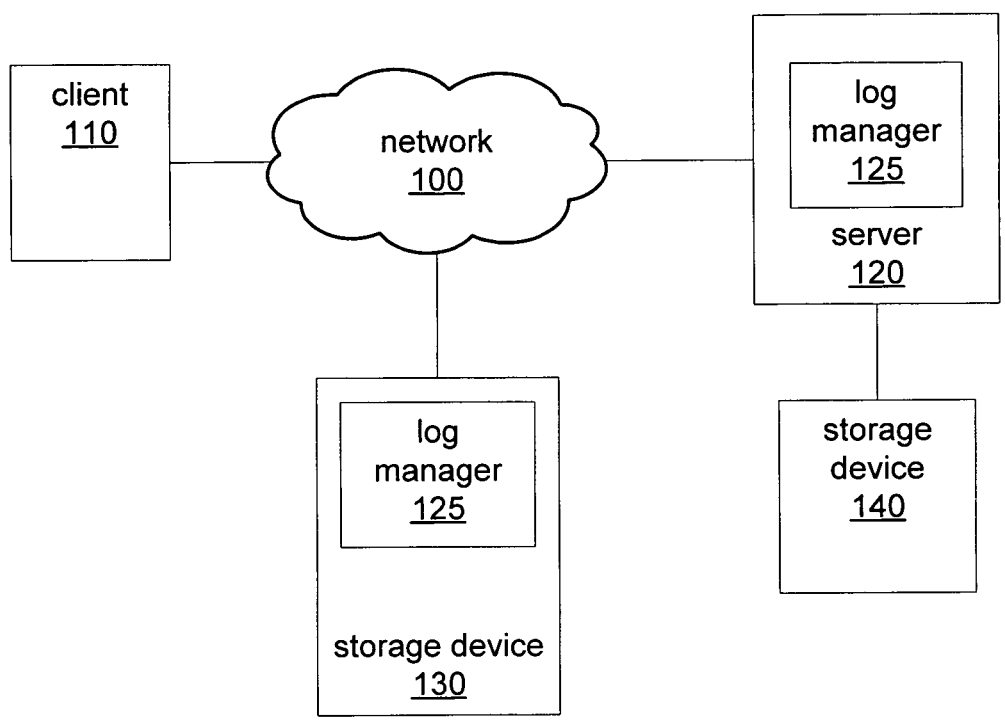
FIG. 1 is a block diagram illustrating several networked computer devices that may be configured to implement recoverable, single-phase logging, according one embodiment.

FIG. 1 illustrates a computer network, according to certain embodiments, in which one or more devices may be configured to implement recoverable, single-phase logging. In such an embodiment, at least one computing device on network 100 may be a client device, such as client 110 with installed software that may be configured to communicate with other devices, request the storing or reading of log entries, and exchange data with storage devices. In one embodiment, at least one computing device on network 100 may be a server device, such as server 120 with installed software that may be configured to communicate with other devices, request the storing or reading of log entries, and exchange data with storage devices. Server 120 may also be configured as a client device similar to client 110. According to some embodiments, one or more devices may be storage devices, such as storage device 130 and storage device 140. Storage devices 130 and 140 may be configured to provide data storage and retrieval services to other devices, such as client 110 and server 120. Storage devices, such as storage device 130 and storage device 140 may provide clients or servers with logging services.

When implementing logging services, data, or metadata, may be written to a separate storage area, called a log or journal, before they are written to their actual location in data storage, according to some embodiments. In certain embodiments, these logs may allow re-creation of partially completed data operations after a system or storage failure. For example, at the restart of a failed system, any outstanding data transactions in the log may be reapplied, or replayed, to the data storage, restoring it to a consistent, or expected state. For some log-structured file systems and forms of non-erasing storage, the log may be the primary storage and organization of data. In yet other cases, logs may be used to track activity of the software or hardware components of the system and track errors and other events for root-cause analysis of software or hardware failures.

Such logging services may include using validation indicators in log entries, as described herein. In other embodiments, a server, such as server 120 may provide logging services in conjunction with storage services from a storage device, such as storage device 140. A server or storage device may implement a log manager process, such as log manager 125 to provide logging services. Please note that even though FIG. 1 illustrates both server 120 and storage device 130 including log manager 125, only a single log manager process may be needed to fully implement the logging services and featured described herein, according to certain embodiments.

For example, in one embodiment, a client 110 may send a multi-block log entry to storage device 130. According to such an embodiment, storage device 130 may implement a log manager process, such as log manager 125, that may receive the multi-block log write from client 110. Log manager 125 may then generate a header block to go with the other data blocks. Such a header block may include information identifying the data blocks of the log entry and may include additional metadata as well, according to various embodiments. For instance, in one embodiment the header block may include information about where the actual data blocks will be stored on the storage device, such as the destination volume, offset within the volume, number of blocks, etc. Log manager 125 may store both the header block and the remaining data blocks on storage device 130, according to one embodiment.

Additionally, in some embodiments, log manager 125 may store a validation indicator in the header block. In one embodiment, log manager 125 may also store the same validation indicator in the metadata for each data block of the log entry. According to certain embodiments, storing a validation indicator in a header block may enable log manager 125 or some other process to later verify the validity of the data blocks, and therefore of the log entry as a whole, when reading that log entry back from storage. For example, when reading a log entry, according to some embodiments, log manager 125 may load the header block and use the information stored in the header block to determine the total number of data blocks for that log entry.

Additionally, in some embodiments, log manager 125 may also use information from the header block to determine where the remaining data blocks are stored. When reading the individual data blocks for the log entry, log manager 125 may, in one embodiment, compare the validation indicator from the metadata for each data block with the validation indicator from the header block to determine whether the log entry, as stored, is valid.

Log manager 125 may, according to various embodiments, use different types of values, object, or structures as validation indicators. For instance, in one embodiment, log manager 125 may create a unique number, possible a globally unique identifier (GUID) for each log entry. In another embodiment, log manager 125 may use a random number as a validation indicator for each log entry, while in yet other embodiments log manager 125 may use a monotonically increasing counter value, a highers clock, a single phase bit, a generation number, or other identifiers, or a combination of various values, objects or structures as validation indicators.

A storage device, such as storage device 130, may be configured to atomically store metadata, including a validation indicator or tag, when storing each data block. For example, in one embodiment, a storage device may store a data block and in the same operation store additional metadata related to the data block, and may guarantee that both the data block and the metadata are committed to storage together. In other words, either they both are written successfully, or neither is written. In one embodiment, storage device 130 may store a data block's metadata in the same storage segment as the data in the data block, but in other embodiments, storage device 130 may store such metadata in a location distinct from the data in a data block.

In one embodiment, log manager 125 may be configured to store a validation indicator in metadata for the header block, as well as, or in place of, storing the validation indicator in the header block itself. In such an embodiment, log manager 125 may also compare the validation indicator from the header block against the validation indicator in the header block's metadata before reading and validating the individual data blocks.

A client device, such as client 110, may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of networkable computing device with a digital heartbeat capable of communicating with processes or devices in a distributed shared storage environment.

Network 100, as illustrated in FIG. 1, may comprise any of various network technologies according to various embodiments. Network 100 may be a local area network, wide area network, intranet network, Internet network, or many other types of network. Network 100 may be designed to be continuously available (although network outages may occur), or may be intermittent (e.g. a modem connection made between a computer system in a user's home and a computer system in a user's workplace). Network 100 may utilize any of a number of different physical networking technologies including, but not limited to, Fiber Channel, Ethernet, Fast-Ethernet, Gigabit-Ethernet, Myrinet, Infiniband, VAX CI, or Server- Net, or others. Network 100 may be configured according to a number of different network topologies including, but not limited to, star, token-ring, token-bus, scatternet, dual-ring, mesh, etc. Network 100 may also be configured to utilize a combination of different networking technologies and/or topologies. Additionally, Network 100 may comprise shared storage or shared memory for communicating between different computer systems or between processes within the same computer system, according to some embodiments. In some embodiments, Network 100 may be the interconnect network for any of various distributed shared storage environments, including, but not limited to, network file system (NFS), common Internet file system (CIFS), storage area network (SAN), network attached storage (NAS), storage-network aggregation, multi-site block storage, object-based storage devices (OBSD), or other asymmetric, out-of-band, or shared storage models.

A server device, such as server 120, may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of networkable computing device with a digital heartbeat capable communicating with other processes or devices in a distributed shared storage environment. Metadata Server 130 may be configured to couple over network 100 to one or more other devices via one or more wired or wireless network interfaces.

A storage device, such as storage device 130 or storage device 140, may be any type of networkable computing device with a digital heartbeat capable communicating with and providing data storage services to other devices or processes in a distributed shared storage environment. According to various embodiments, storage devices 130 and 140 may be configured to implement any of numerous data storage models including but not limited to, storage-network attach, storage-network aggregation (SNA), network attached storage (NAS), storage area network (SAN), Redundant Array of Independent (or Inexpensive) Disks (RAID), or as object-based storage devices (OBSDs). In certain embodiments, storage device 130 may be configured to implement a combination of different data storage models. Storage device 130 may utilize one or more of numerous types of storage media including but not limited to Hard disk storage, floppy disk storage, removable disk storage, flash memory and random access memory (RAM) are examples of storage media. The terms "storage" and "storage medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The storage medium may include other types of storage as well, or combinations thereof.

In one embodiment, a server device, such as server 120 may implement a log manager process, such as log manager 125, similar to log manager 125 described above. According to certain embodiments, server 120 may be configured to manage the storing and reading of log entries on a storage device, such as storage device 140.

Figure 2:
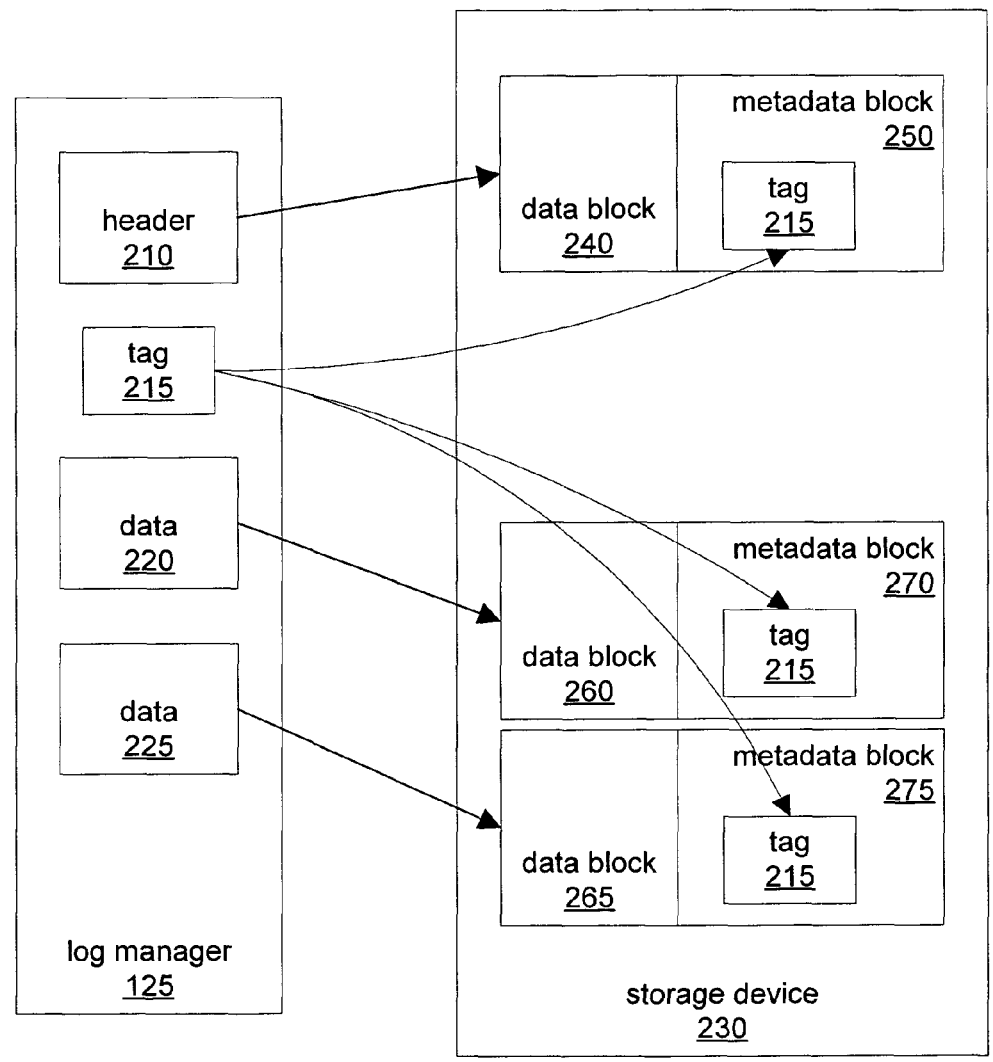
FIG. 2 is a block diagram illustrating, according to one embodiment, a log manager storing a log entry with a validation tag in the metadata of each block.

FIG. 2 illustrates, according to certain embodiments, a log manager process, log manager 125, storing a log entry on storage device 230. Log manager 125 may reside on storage device 125, as described above regarding log manager 125, or may reside on a separate device, such as log manager 125 on server 120, also described above, according to various embodiments. Log manager 125 may be configured to receive a log entry including data 220 and 225 or log manager 125 may generate its own log entries, depending upon the specific embodiment. After receiving a log entry, log manager 125 may, according to one embodiment, generate header 210. According to various embodiments, log manager 125 may include information in header 210 regarding the number of data blocks in this log entry, and may also include information about where the data blocks will be stored. Log manager 125 may also generate validation indicator tag 215, in one embodiment. As described above, tag 215 may be a unique identifier, or may be randomly generated, or may be provided by the process that originally sent the log entry in the first place, according to various embodiments.

When storing the log entry on storage device 230, log manager 125 may be configured to store header 210 in data block 240 along with metadata about header 210 in metadata block 250, in one embodiment. Additionally, in some embodiments, log manager 125 may be configured to store validation tag 215 with the metadata in metadata block 250. Further, according to on embodiment, log manager 125 may be configured to store the data 220 in data block 260 and data 225 in data block 265. When storing data blocks 260 and 265, log manager 125 may store tag 215 in the metadata for each data block, in some embodiments. As described above, storage device 230 may be configured to atomically store metadata for each data block when storing the actual data block, in on embodiment. For example, storage device 230 may be configured to expose an API, messaging channel, or other means to allow log manager 125 to specify data to be stored in the metadata for a data block. In one embodiment log manager 125 may include tag 215 as an additional parameter to a write command when storing data block 260 on storage device 230.

In one embodiment, an existing write command may be enhanced to also include metadata to be atomically stored with a data block. For instance, an enhanced SCSI write command may be provided to allow applications using the SCSI protocol to include validation indicators in metadata to be stored atomically with data blocks. In one embodiment, an enhanced SCSI write command may be used to implement recoverable logs as described herein. Additionally, an enhanced, or additional, SCSI read command may be provided to retrieve the metadata for a specific data block or a range of blocks. Such an enhanced SCSI read command may read and return both a data block and its associated metadata, or may read and return only the metadata for a data block. In other embodiments, an enhanced command may request only a validation that the metadata for a given block or range of blocks contains a specified validation tag 215.

For example, log manager 125 may store the data 220 in data block 260 while storing tag 215 in metadata block 270, in one embodiment. Similarly, log manager 125 may store data 225 in data block 265, while storing tag 215 in metadata block 275.

Figure 3:
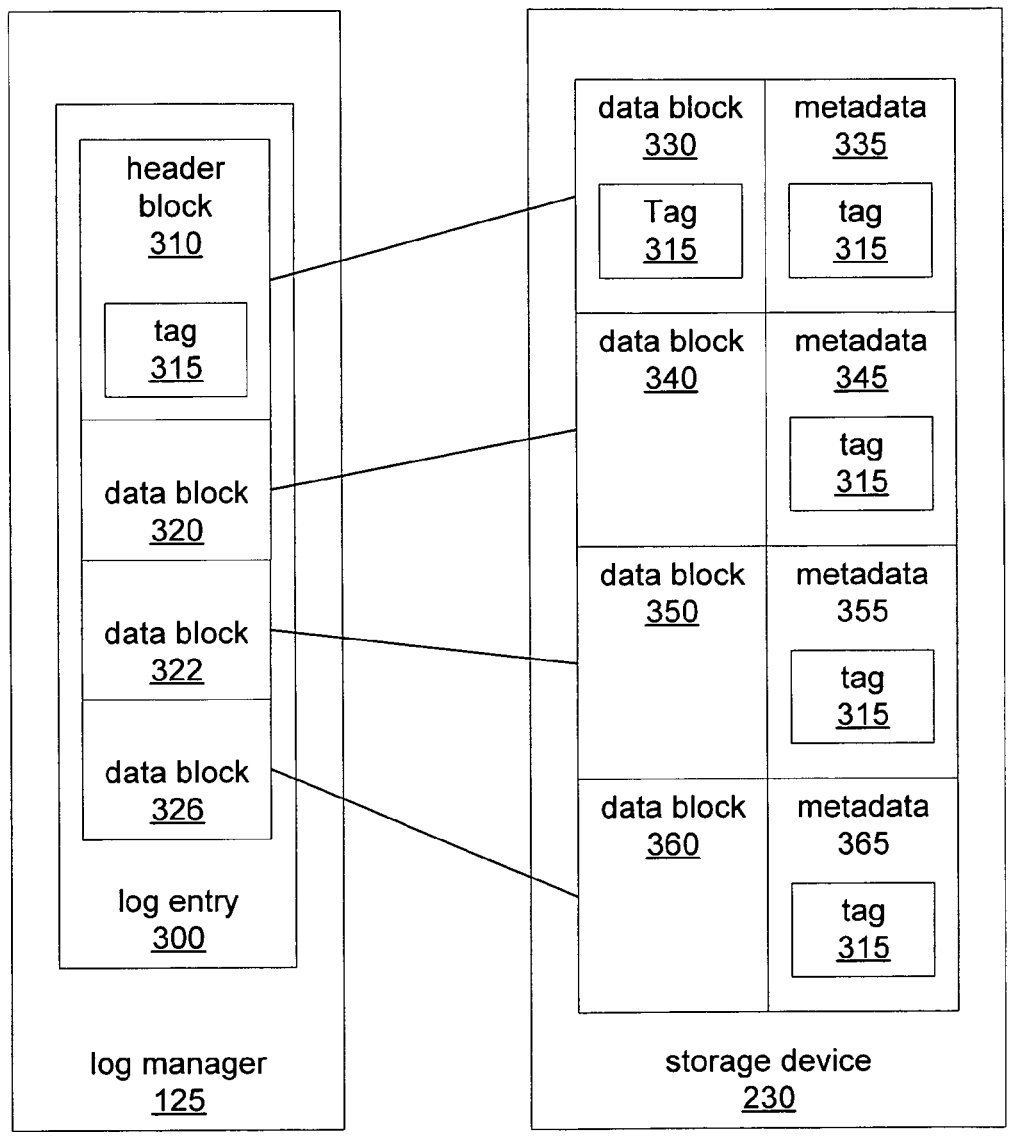
FIG. 3 is a block diagram illustrating a log manager storing a log entry with the validation tag stored in the header block as well as in the metadata for each data block.

FIG. 3 illustrates log manager 125 storing log entry 300 on storage device 230, according to another embodiment. In such an embodiment, log manager 125 may receive log entry 300 including data blocks 320, 322, and 326. To facilitate reliable recovery of log entry 300, in one embodiment log manager 125 may generate header 310 and validation tag 315, as described above. Log manager 125 may be configured, according to one embodiment, to store header block 310, including tag 315, on storage device 230 as data block 330 and metadata 335. Additionally, in one embodiment, log manager 125 may be configured to store data blocks 320, 322 and 326 as data blocks 340, 350 and 360, respectively, and may also be configured to store tag 315 in metadata 345, 355, and 365.

Figure 4:
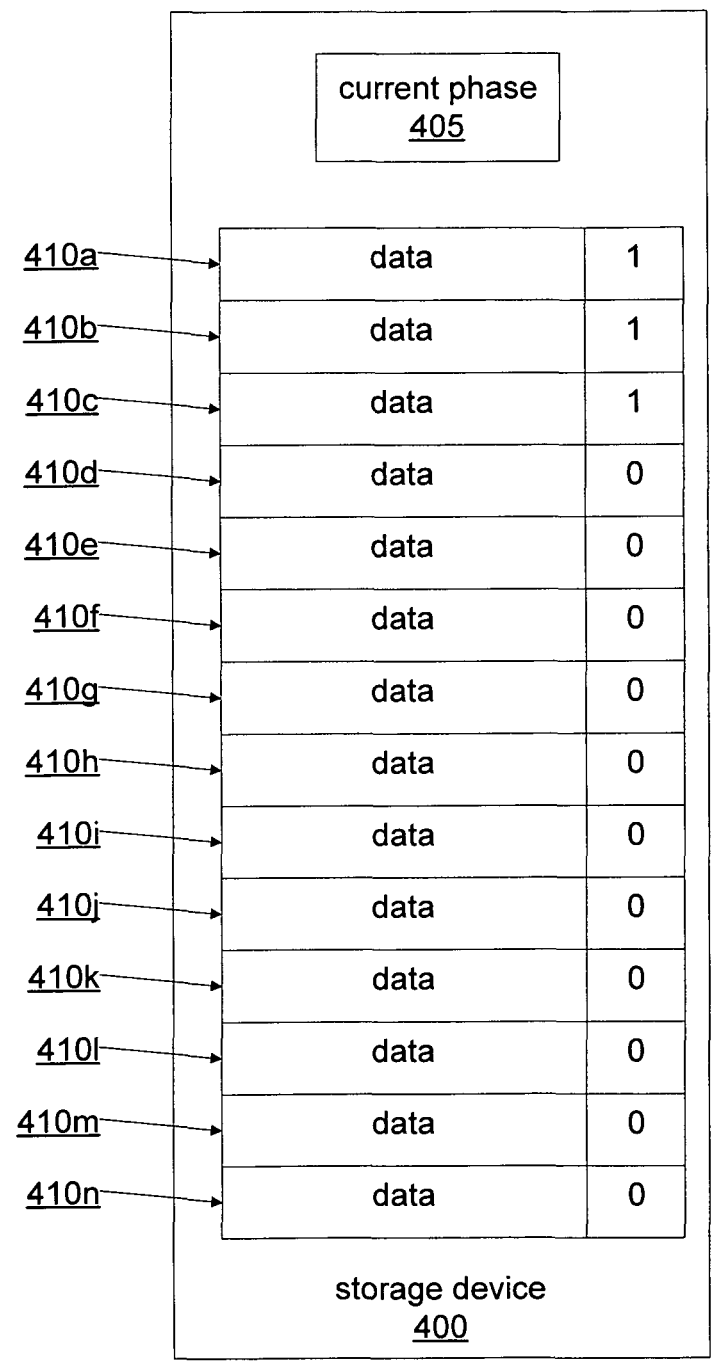
FIG. 4 illustrated, as in one embodiment, a circular log implemented using a phase bit in the metadata of each data block.

FIG. 4 illustrates, according to one embodiment, a circular log implemented using a phase bit as a validation indicator. Storage device 400 may be configured to implement a circular log structure that may wrap, reusing the oldest entries again when the log fills up. In some embodiments, such a log may be used when log entries only need to be stored temporarily, perhaps only long enough to cover the latency of committing data updates to other forms of data storage, or during transactional database updates. In other embodiments, such a log may be used for event and error logging, when entries in the log have a limited time span of usefulness and can be discarded on log wrap-around.

For such a circular log, a log manager, such as log manager 125 may use a phase bit as a validation indicator, according to some embodiments. Storage device 400 may maintain a current phase 405 for use when storing the circular log entries and may provide an interface to allow a log manager process or other logging application to flip or set the current phase 405.

When using a single bit as a validation indicator in a circular log, storage device 400, or a log manager process, may flip the current phase bit 405 when the circular log wraps. For example, a phase bit value of zero may initially be used as log entries are written to storage device 400 using a circular log, in one embodiment. When the space available for log entries is full, storage device 400 may be configured to "wrap" the log and overwrite the oldest log entry, according to certain embodiments. In one embodiment, storage device 400 may "flip" the phase bit and begin storing phase bit values of one when storing log entries.

In the embodiment illustrated in FIG. 4, storage device 400 has room to store 14 data blocks, blocks 410a-n, in a circular log. Please note that FIG. 4 represents just one of many possible embodiments, and that storage device and circular logs may store many more data blocks than the 14 illustrated herein by way of example. Storage device 400 may, according to some embodiment be configured to store a phase bit as a validation indicator with each data block in the circular log. In one embodiment, storage device 400 may store the phase bit as a part of the metadata associated with each data block. According to the embodiment illustrated by FIG. 4, storage device 400 may have already wrapped the log at least once, as shown by the phase bit values of 1 for data blocks 410a, b and c. Data blocks 410d-n may still show a phase bit value of 0, since they may have been written before the log wrapped.

When reading a log entry from a circular log, such as that illustrated in FIG. 4, the phase bit stored for each data block of the log entry may be compared to determine whether the log entry as stored is valid. For example, in one embodiment, log manager 125, described above, may be using a circular log on storage device 400, such as that illustrated by FIG. 4. When storing a particular log entry, log manager 125 may first store header block, as described above, in data block 410a, according to one embodiment. Perhaps the circular log on storage device 400 was filled previously, and therefore storage device 400 may have wrapped the log and flipped the phase bit after last storing data in datablock 410n, in one embodiment. Alternately, in another embodiment, log manager 125 may be responsible for maintaining the determining when to wrap the circular log and when to flip the phase bit. In one embodiment log manager 125 may flip the phase bit after storing the data in data block 410n, while in other embodiments, log manager 125 may not flip the phase bit until next having to store data in data block 410a.

As an example of how log manager 125 may, in one embodiment, validate log entry using a phase bit, consider following. Log manager 125 may be storing a log entry containing 4 data blocks plus one header data block to a circular log on storage device 400, according to one embodiment. Perhaps, in one embodiment, a system failure occurs after storing the header block in 410a, and two data blocks in 410b and 410c, but between storing the final two data blocks in 410d and 410e, respectively. In such an example, and according to the embodiment illustrated by FIG. 4, blocks 410a, 410b, and 410c would have phase bit values of 1, while block 410d and 410e would have phase bit values of 0. After the system is restarted, perhaps log manager 125 attempts to load the log entry from the circular log on storage device 400. According to one embodiment, log manager 125 may first read the header block out of 410a, and using information in the header block, then read four data blocks from 410b, 410c, 410d, and 410e and compare the phase bits for the data blocks with the phase bit for the header block, in one embodiment. In such an example, log manager 125 may determine that the log entry is invalid because the phase bit for data blocks 410d and 410e do not match the phase bit for the header block.

Figure 5:
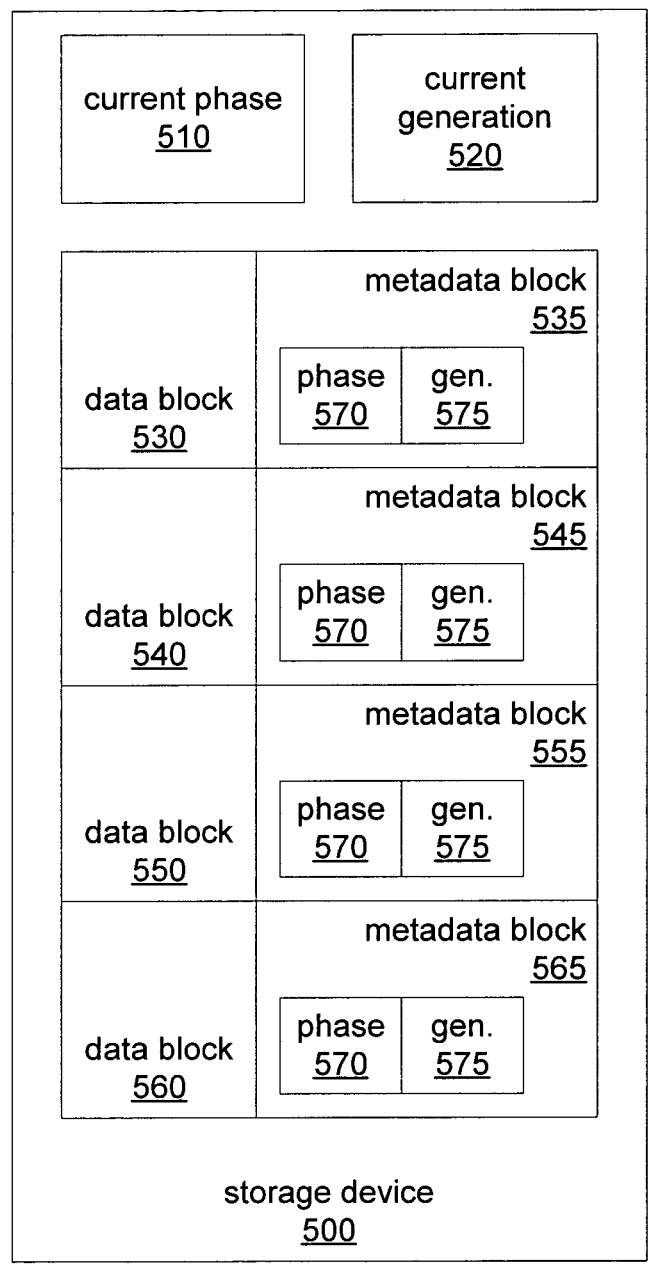
FIG. 5 is a diagram illustrating, according to one embodiment, the use a current phase and current generation number in a log entry.

FIG. 5 illustrates a storage device storing log entries using a current phase bit value and a current generation number, according to one embodiment. Storage device 500 may store log entries using a circular log structure similar to the log illustrated in FIG. 4, described above, or may use other log structures, according to various embodiments. Storage device 500 may, in one embodiment, be configured to use a generation number as part of a validation indicator in addition to a phase bit. Storage device 500 may maintain a current phase bit value, such as current phase 510, and a current generation number, such as current generation 520, according to some embodiments.

When storing the data blocks of a log entry, storage device 500, or a log manager processes on storage device 500, may store the current phase bit and the current generation number in the metadata for each data block. For example, as illustrated in FIG. 5, a log entry on storage device 500 may include data blocks 530, 540, 550 and 560. When storing data block 530, storage device 500 may, in one embodiment, store the current phase value from current phase 510 in phase 570 and may store the value of the current generation in gen. 575. Storage device 500 may store both phase 570 and gen. 575 in the metadata for data block 530 as part of metadata block 535. Similarly, storage device 500 may store phase 570 and gen. 575 in the metadata for data blocks 540, 550, and 560 as part of metadata blocks 545, 55, and 565, respectively.

In one embodiment, storage device 500 may provide an interface to allow a log manager process, such as log manager 125, or other logging application, to read or set the current phase 510 and the current generation 520. For example, log manager 125 may set current phase 510 to zero every time the system is reset and may increment current generation 520 to ensure that no existing log entries that may also have been stored with a phase value of zero are used as valid log entries. After log manager 125 sets current phase 510 and current generation 520, storage device 500 may use those values when storing individual log entries, according to certain embodiments. In such an embodiment, log manager 125 may set the current phase and generation values once and then write log entries without having to specify the phase and generation values each time. Note that this is similar to the embodiments described above regarding FIGS. 2 and 3. However, the unique identifier/tag is a phase+generation combo. The difference from a "pure" phase model described above is that more space in the block's metadata may be needed to store the tag. On the other hand, unlike the pure "tag every block" model, a standard, unmodified transport protocol, such as standard SCSI, may be used to issue every I/O. The only modification to such a protocol may be the addition of a command to set the generation and/or phase on the device. This may allow devices that implement such an embodiment to be fully compatible with current transport protocols, such as the standard SCSI protocol, and possibly requiring only a small, non-intrusive, custom extension to such a protocol. Additionally, in some embodiments, such an extension may be implemented through vendor-custom mode pages and well-known means of extending transport protocols, such as the SCSI protocol.

When reading a log entry stored using a phase bit and a generation number as validation indicators, storage device 500 may check the value of the phase bits from each data block against the phase bit stored in the header block for that log entry, but may also compare the generation number for each stored data block against the current generation number to ensure that they are all part of the currently valid log session. According to some embodiments, to be valid the phase bits from the data blocks of a stored log entry do not have to match the value of the current phase bit, but they may have to match the value of the phase bits from all the other data blocks of the log entry, including the header block. For example, a log manager, such as log manager 125, may store several data blocks for a log entry using a current phase bit value of 0 and load that log entry later after the log has wrapped when the current phase bit value is 1. In such an example, the phase bits stored in the data blocks for the log entry may not match the current phase bit value, but they may match each other and may match the phase bit stored in the header block.

A generation number may, in one embodiment, allow a log manager process or a storage device to efficiently invalidate all the currently stored log entries. For example, in one embodiment, a storage device may change the generation number after the currently stored log has been recovered and a new logging session is started. In some embodiments, a log manager process or storage device may expose an API or other means to allow other processes or devices to request that the generation number be changed or to otherwise request that a new log session be started.

Figure 6:
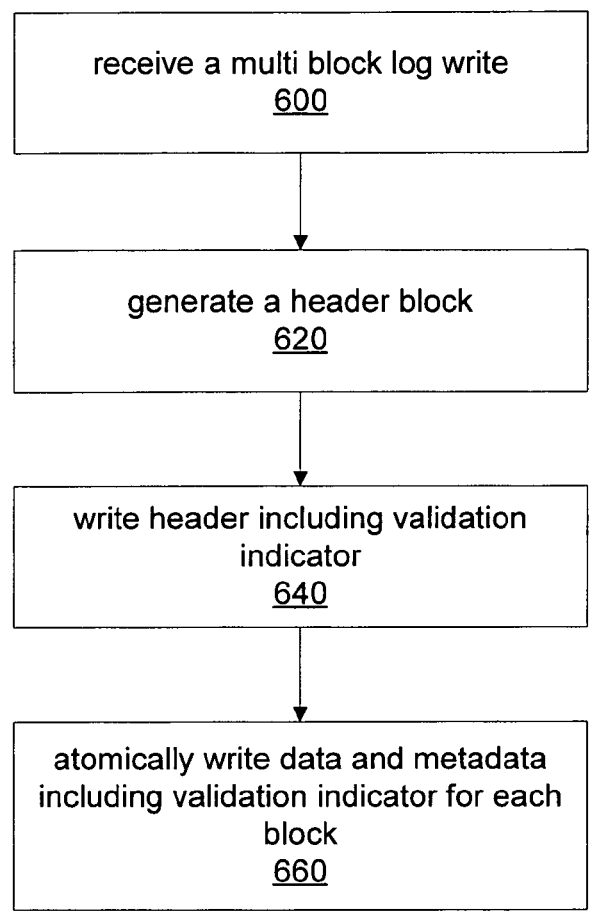
FIG. 6 is a flow diagram illustrating one embodiment of a method for storing recoverable log entries.

FIG. 6 is a flow diagram illustrating, according to one embodiment, a method for storing a log entry using a validation indicator. A log manager process, such as log manager 125 described above, may receive a multi block log write from another process or device, as illustrated by block 600. Alternatively, according to one embodiment, log manager 125 may generate multi-block log writes internally. Log manager 125 may then generate a header block as illustrated by block 620. As described above, log manager 125 may include various data about the log entry in the header block prior to writing the header including a validation indicator as illustrated by block 640. According to various embodiments, log manager 125 may use any of various type of validation indicators in the header block, as described above, including but not limited to a GUID, a random number, a phase bit, a generation number, or a combination thereof.

After writing the header block including the validation indicator, as illustrated by block 640, log manager 125 may, in some embodiments, atomically write the data and metadata including the validation indicator for each data block of the log entry, as illustrated by block 660.

FIG. 6 illustrates one of numerous possible embodiments. Other embodiments may perform the actions and functions illustrated in FIG. 6 in a different order or may add actions or functions or may omit one or more actions that are performed by the embodiment illustrated by FIG. 6.

Figure 7:
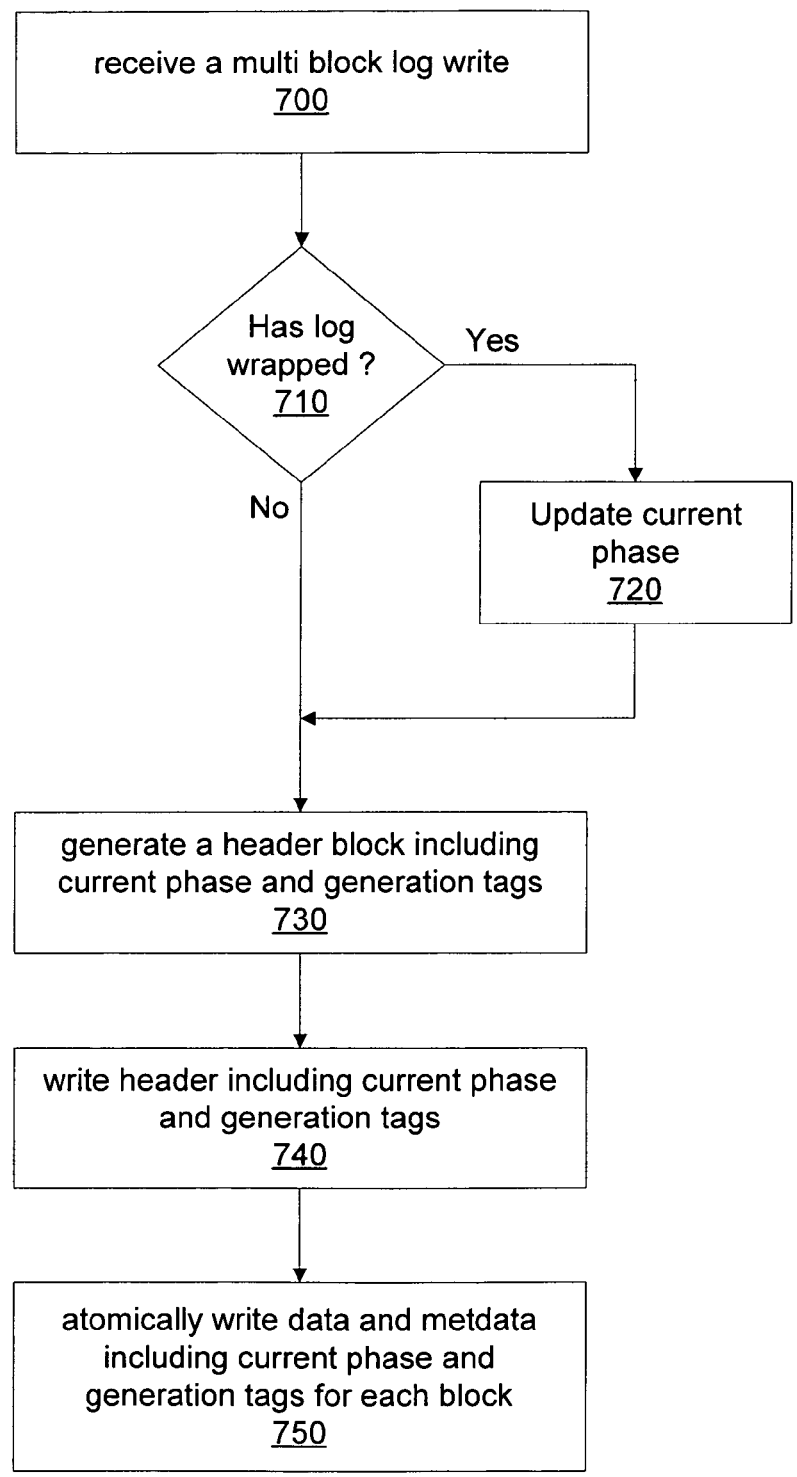
FIG. 7 is a flow diagram illustrating one embodiment of a method for using a phase bit and a generation number when storing recoverable log entries.

FIG. 7 illustrates a method, according to one embodiment, for storing a log entry using a phase bit and a generation number as a validation indicator. In such an embodiment, a log manager process, such as log manager 125 described above, may receive a multi block log write as illustrated in block 700 and may, as illustrated in block 710, determine whether the current log structure needs to be wrapped. In one embodiment, log manager 125 may wrap the log, and begin overwriting the earlier entries whenever the space available to the log has been filled. If the log has wrapped, log manager 125 may the update current phase bit value as illustrated by block 720. In one embodiment, log manager 125 may verify that all the data blocks, including the header block, may fit into the current log structure when determining whether to wrap the log and update the current phase bit value, and may thereby ensure that the log will not have to be wrapped while storing the data blocks for the currently log entry. In one embodiment, if the log has to be wrapped, necessitating a phase bit change, the log manager may want all blocks in a particular log entry to have a coherent phase value to simplify recovery. However, in such an embodiment, the pending log entry may not fit in the available space at the end of the log. In this case the log manager may write out properly formatted empty ("dummy") log blocks to pad the log to the end of the device and over-write any older data that may be located there prior to wrapping the log, changing the phase bit and writing the pending entry with the new phase value.

After flipping, or inverting, the current phase bit, if required, log manager 125 may, in one embodiment, generate a header block including the current phase bit and the current generation number as illustrated by block 730. As described above, a log manager may maintain a current generation number for use with logging. The current generation number may, in some embodiments, be stored in the metadata for each data block of the log entry. As shown in block 740, log manager 125 may write the header including the current phase and generation number to storage, according to one embodiment. Alternatively, according to certain embodiments, log manager 125 may also store the current phase bit and generation number in the metadata for the header block and atomically write the header and its metadata including the current phase bit and generation number to storage.

After writing the header block, log manager 125 may, in one embodiment, may store the current phase bit and generation number in the metadata for each data block and may, as illustrated by block 750, atomically write the data and metadata including the current phase and generation for each data block to storage.

In other embodiments, log manager 125 may not use a generation number with a phase bit as validation indicator and therefore may not maintain a current generation number. In such an embodiment, log manager 125 may store only the current phase in the header, and possibly the header's metadata, as well as in the metadata for each data block.

FIG. 7 illustrates one of numerous possible embodiments. Other embodiments may perform the actions and functions illustrated in FIG. 7 in a different order or may add actions or functions or may omit one or more actions that are performed by the embodiment illustrated by FIG. 7.

Figure 8:
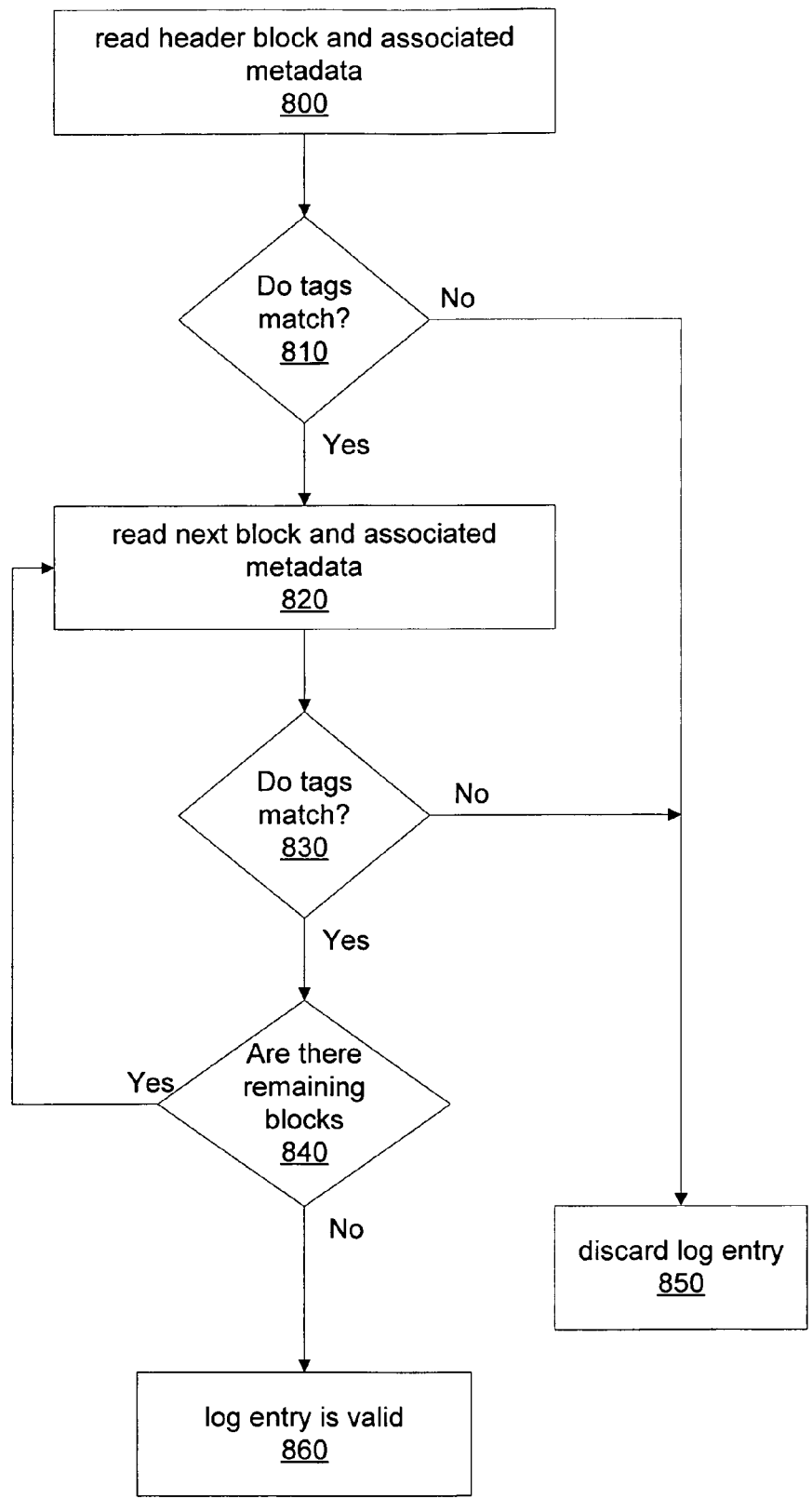
FIG. 8 is a flow diagram illustrating one embodiment of a method for reading and validating a recoverable log entry.

FIG. 8 illustrates, according to one embodiment, a method for reading and validating a log entry from storage. In such an embodiment, a log manager, such as log manager 125, may read a log entry from storage and verify that the log entry as stored is valid. As illustrated by block 800, log manager 125 may first read the header block and its metadata from storage, in one embodiment. In some embodiments, log manager 125 may be able to read both the header block and the metadata in a single operation, if the storage device or medium provides such a service. In other embodiments, log manager 125 may have to read the header block and the metadata separately. In yet other embodiments, log manager 125 may not read the header block's metadata at all because the header data block may contain all the information log manager 125 needs to load and verify the remaining data blocks.

After reading the header block and its metadata from storage, log manager 125 may, according to certain embodiments, check the validation indicators stored in the header block against the validation indicators stored in the header block's metadata. As described above, a log entry may include any of a number of different types of validation indicators, or even a combination of validation indicators, such as a phase bit and a generation number. As illustrated by block 810, in one embodiment log manager 125 may check that the validation indicators from both the header and the header's metadata match. If the validation indicators do not match, log manager 125 may invalidate and discard the entire log entry, as illustrated by block 850. In certain embodiments, where validation indicators may not be stored in the metadata for a header block, log manager 125 therefore may not compare the validation indicators between the header and the header's metadata.

If the validation indicators match between the header and the header's metadata, log manager 125 may, in some embodiments, read and validate the individual data blocks of the log entry. As shown by block 820, log manager 125 may read a next data block and its associated metadata, in one embodiment. In certain embodiments, log manager 125 may be configured to read the data block and its metadata together in a single operation, if the storage device or medium provides such a service. In other embodiments, however, log manager 125 may read the data block and its metadata in separate operations.

Log manager 125 may, in one embodiment, determine the validity of the data block by comparing the validation indicator from the data block's metadata with the validation indicator from the header block, or from the header block's metadata, as illustrated by block 830. As described above regarding the header block, if the validation indicator for the data block does not match the validation indicator for the header block, log manager 125 may discard the log entry, as illustrated by block 850.

In an alternate embodiment, log manager 125 may be configured to read all the data blocks before validating any of them, while in other embodiments, log manager 125 may validate each data block as it is read and may therefore not read any remaining data blocks if any data block is determined to be invalid.

If the validation indicator for the data block does match the validation indicator for the header block, log manager 125 may, in certain embodiments, determine whether there are remaining data blocks to process, as illustrated by decision block 840. If, in such an embodiment, there are additional data blocks to load from storage, log manager 125 may loop to read the next block as illustrated by block 820. Log manager 125 may, according to some embodiments, continue reading and validating data blocks until the entire log entry has been loaded and each data block validated. If all data blocks of the log entry have been loaded and validated, that is if the validation indicators from the metadata for each data block match the validation indicator for the header block, log manager 125 may then determine that the log entry has a whole is valid, as illustrate by block 860. In alternate embodiment, however, no such overall determination may be made.

It should be noted that FIG. 8 illustrates one of numerous possible embodiments. Other embodiments may perform the actions and functions illustrated in FIG. 8 in a different order or may add actions or functions or may omit one or more actions that are performed by the embodiment illustrated by FIG. 8.

Figure 9:
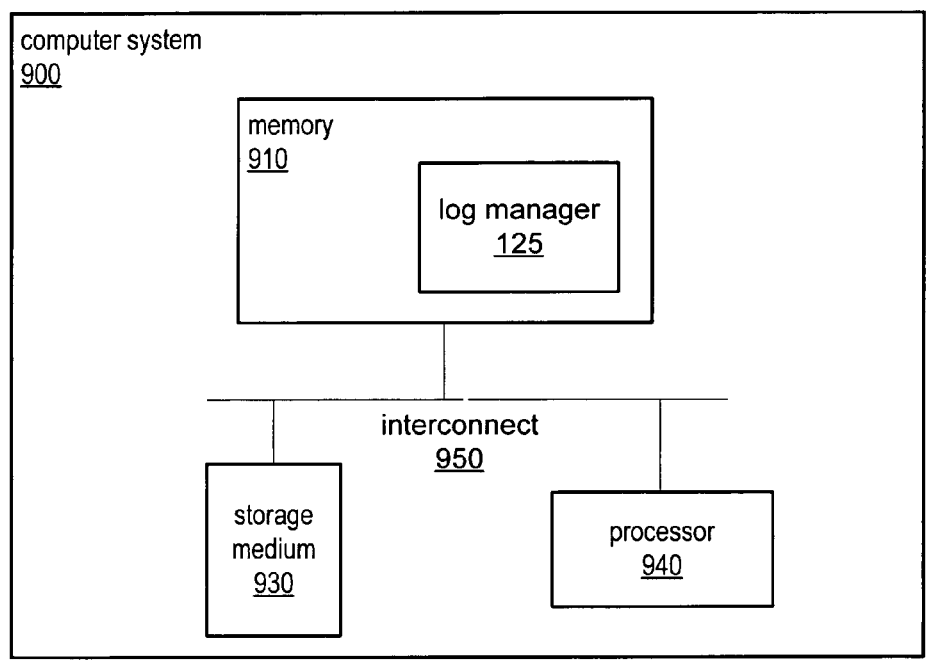
FIG. 9 is a block diagram illustrating a computer system suitable for implementing recoverable singe-phase logging, according to one embodiment.

FIG. 9 illustrates a computing system capable of implementing recoverable, single-phase logging as described herein and according to various embodiments. Computer system 900 may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of networkable computing device with a digital heartbeat. Computer system 900 may include at least one processor 940. Processor 940 may couple across interconnect 950 to memory 910 and network interface 930. Network interface 930 may be any of various types of interfaces configured to couple with and communicate over network 100 illustrated in FIG. 1 and described above.

Memory 910 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 910 may include program instructions configured to store and load log entries creating using recoverable, single-phase logging as described above. In certain embodiments memory 910 may include program instructions configured to implement a log manager server, such as log manager 125. In one embodiment, log manager 1020 may include program instructions configured to store and load log entries creating using recoverable, single-phase logging. In other embodiments, memory 910 may include program instructions configured to implement a storage device such as storage device 130 illustrated in FIG. 1 and described above. In some embodiments, such a storage implemented by program instructions included in memory 910 may perform some or all of the functions for implementing recoverable, single-phase logging.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
   receiving a log entry including a plurality of data blocks;
   generating a header block for the log entry, wherein the header block includes a validation indicator;
   storing the header block; and
   atomically storing each data block of the log entry and respective metadata associated with the respective data block, wherein said atomically storing comprises storing each data block and its associated metadata as a single, logical operation, and wherein said atomically storing further comprises storing the validation indicator in each data block's associated metadata.

2. The method of claim 1, further comprising:
reading the header block;
reading each of the plurality of data blocks and its associated metadata;
checking the validation indicator of each data block's associated metadata against the validation indicator of the header block; and
determining that the log entry is valid if the validation indicator from every block's metadata matches the validation indicator of the header block.

3. The method of claim 2, further comprising determining that the log entry is invalid if the validation indicator of any data block's associated metadata does not match the validation indicator of the header block.

4. The method of claim 2, further comprising:
generating metadata for the header block including the validation indicator;
wherein said storing the header block comprises atomically storing the header block and its metadata;
wherein said reading the header block comprises reading the header block and its metadata; and
wherein said checking comprises checking the validation indicator of each data block's metadata with the validation indicator of the header block's metadata.

5. The method of claim 2, wherein the validation indicator comprises an identifier unique to the log entry.

6. The method of claim 2, wherein the validation indicator comprises a phase bit, the method further comprising:
maintaining a circular log and a current phase bit; and
wherein said generating a header block comprises:
inverting the current phase bit if the log entry causes the log to wrap; and
copying the current phase bit to the validation indicator.

7. The method of claim 6, wherein the validation indicator further comprises a generation number, the method further comprising:
maintaining a current generation number;
wherein said generating a header block further comprises copying the current generation number to the validation indicator; and
wherein said checking includes comparing both the phase bit and the generation number of the validation indicator of each data block's metadata against the phase bit and the generation number of the validation indicator of the header block's metadata.

8. The method of claim 7, further comprising:
receiving a request to invalidate all stored log entries; and
invalidating all stored log entries by changing the current generation number.

9. The method of claim 1, wherein said generating a header block comprises including in the header block information identifying each data block of the log entry.

10. The method of claim 1, further comprising receiving the log entry and the validation indicator from a client.

11. A device, comprising:
a processor; and
a memory coupled to the processor, wherein the memory comprises program instructions configured to:
receive a log entry including a plurality of data blocks;
generate a header block for the log entry, wherein the header block includes a validation indicator;
store the header block; and
atomically store each data block of the log entry and respective metadata associated with the respective data block, wherein said atomically storing comprises storing each data block and its associated metadata as a single, logical operation, and wherein said atomically storing comprises storing the validation indicator in each data block's associated metadata.

12. The device of claim 11, wherein the program instructions are further configured to:
read the header block;
read each of the plurality of data blocks and its associated metadata;
check the validation indicator of each data block's associated metadata against the validation indicator of the header block; and
determine that the log entry is valid if the validation indicator from every block's metadata matches the validation indicator of the header block.

13. The device of claim 12, wherein the program instructions are further configured to determine that the log entry is invalid if the validation indicator of any data block's associated metadata does not match the validation indicator of the header block.

14. The device of claim 12, wherein the program instructions are further configured to:
generate metadata for the header block including the validation indicator;
wherein said storing the header block comprises atomically storing the header block and its metadata;
wherein said reading the header block comprises reading the header block and its metadata; and
wherein said checking comprises checking the validation indicator of each data block's metadata with the validation indicator of the header block's metadata.

15. The device of claim 12, wherein the validation indicator comprises an identifier unique to the log entry.

16. The device of claim 12, wherein the validation indicator comprises a phase bit, and wherein the program instructions are further configured to:
maintain a circular log and a current phase bit; and
wherein in said generating a header block, the program instructions are further configured to:
flip the current phase bit if the log entry causes the log to wrap; and
copy the current phase bit to the validation indicator.

17. The device of claim 16, wherein the validation indicator further comprises a generation number, wherein the program instructions are further configured to:
maintain a current generation number;
wherein in said generating a header block, the program instructions are further configured to copy the current generation number to the validation indicator; and
wherein in said checking, the program instructions are configured to compare both the phase bit and the generation number of the validation indicator of each data block's metadata against the phase bit and the generation number of the validation indicator of the header block's metadata.

18. The device of claim 17, wherein the program instructions are further configured to:
receive a request to invalidate all stored log entries; and
invalidate all stored log entries by changing the current generation number.

19. The device of claim 11, wherein in said generating a header block, the program instructions are configured to include in the header block information identifying each data block of the log entry.

20. The device of claim 11, wherein the program instructions are further configure to receive the log entry and the validation indicator from a client.

21. A computer-readable, storage medium, comprising program instructions computer-executable to implement:
receiving a log entry including a plurality of data blocks;
generating a header block for the log entry, wherein the header block includes a validation indicator;
storing the header block; and
atomically storing each data block of the log entry and respective metadata associated with the respective data block, wherein said atomically storing comprises storing each data block and its associated metadata as a single, logical, operation, and wherein said atomically storing comprises storing the validation indicator in each data block's associated metadata.

22. The computer-readable, storage medium of claim 21, wherein the program instructions are further computer-executable to implement:
reading the header block;
reading each of the plurality of data blocks and its associated metadata;
checking the validation indicator of each data block's associated metadata against the validation indicator of the header block; and
determining that the log entry is valid if the validation indicator from every block's metadata matches the validation indicator of the header block.

23. The computer-readable, storage medium of claim 22, wherein the program instructions are further computer-executable to implement determining that the log entry is invalid if the validation indicator of any data block's associated metadata does not match the validation indicator of the header block.

24. The computer-readable, storage medium of claim 22, wherein the program instructions are further computer-executable to implement:
generating metadata for the header block including the validation indicator;
wherein said storing the header block comprises atomically storing the header block and its metadata;
wherein said reading the header block comprises reading the header block and its metadata; and
wherein said checking comprises checking the validation indicator of each data block's metadata with the validation indicator of the header block's metadata.

25. The computer-readable, storage medium of claim 22, wherein the validation indicator comprises an identifier unique to the log entry.

26. The computer-readable, storage medium of claim 22, wherein the validation indicator comprises a phase bit, wherein the program instructions are further computer-executable to implement:
maintaining a circular log and a current phase bit; and
wherein said generating a header block comprises:
inverting the current phase bit if the log entry causes the log to wrap; and
copying the current phase bit to the validation indicator.

27. The computer-readable, storage medium of claim 26, wherein the validation indicator further comprises a generation number, wherein the program instructions are further computer-executable to implement:
maintaining a current generation number;
wherein said generating a header block further comprises copying the current generation number to the validation indicator; and
wherein said checking includes comparing both the phase bit and the generation number of the validation indicator of each data block's metadata against the phase bit and the generation number of the validation indicator of the header block's metadata.

28. The computer-readable, storage medium of claim 27, wherein the program instructions are further computer-executable to implement:
receiving a request to invalidate all stored log entries; and
invalidating all stored log entries by changing the current generation number.

29. The computer-readable, medium of claim 21, wherein in said generating a header block, the program instructions are further computer-executable to implement including in the header block information identifying each data block of the log entry.

30. The computer-readable, storage medium of claim 21, wherein the program instructions are further computer-executable to implement receiving the log entry and the validation indicator from a client.

* * * * *